(12) United States Patent
Bökelund (10) Patent No.: US 11,307,102 B2
(45) Date of Patent: Apr. 19, 2022

(54) SYSTEM AND A METHOD FOR DETERMINING A CORRECT OR INCORRECT POSITION OF A TEMPERATURE SENSOR OF AN EMISSION CONTROL SYSTEM

(71) Applicant: Scania CV AB, Södertälje (SE)

(72) Inventor: Björn Bökelund, Södertälje (SE)

(73) Assignee: Scania CV AB, Södertälje (SE)

( * ) Notice: Subject to any disclaimer, the term of this patent is extended or adjusted under 35 U.S.C. 154(b) by 173 days.

(21) Appl. No.: 16/479,964

(22) PCT Filed: Feb. 19, 2018

(86) PCT No.: PCT/SE2018/050158
§ 371 (c)(1),
(2) Date: Jul. 23, 2019

(87) PCT Pub. No.: WO2018/151663
PCT Pub. Date: Aug. 23, 2018

(65) Prior Publication Data
US 2019/0368948 A1    Dec. 5, 2019

(30) Foreign Application Priority Data
Feb. 20, 2017   (SE) ..................... 1750166-9

(51) Int. Cl.
*G01K 15/00*   (2006.01)
(52) U.S. Cl.
CPC ....... *G01K 15/007* (2013.01); *G01K 2205/04* (2013.01)
(58) Field of Classification Search
CPC ............... F01N 11/002; F01N 2560/06; F01N 2900/0416; F01N 2900/1811;
(Continued)

(56) References Cited

U.S. PATENT DOCUMENTS

| 7,680,587 B2 * | 3/2010 | Elfvik | ..................... F01N 11/00 701/114 |
| 8,915,645 B2 * | 12/2014 | Genssle | ................ F01N 11/002 374/1 |

(Continued)

FOREIGN PATENT DOCUMENTS

| WO | WO 2007/073324 A1 | 6/2007 |
| WO | WO 2014/035323 A1 | 3/2014 |

OTHER PUBLICATIONS

International Search Report dated May 28, 2018 in corresponding PCT International Application No. PCT/SE2018/050158.

(Continued)

*Primary Examiner* — Kyle R Quigley
(74) *Attorney, Agent, or Firm* — Banner & Witcoff, Ltd.

(57) ABSTRACT

A method that determines a correct or an incorrect position of a temperature sensor in an emission control system, the method including: determining a first reference temperature within a first temperature interval; measuring a first temperature with the temperature sensor corresponding to the first temperature interval; determining a second reference temperature within a second temperature interval; measuring a second temperature with the temperature sensor corresponding to the second temperature interval; determining a value for a characteristic parameter based on the first reference temperature, the first measured temperature, the second reference temperature and the second measured temperature; comparing the determined value for the characteristic parameter with a predetermined characteristic parameter threshold value that is based upon the determined operation parameter results for different positions of the temperature sensor for predetermined engine operation characteristics; and based upon the comparison, determining a correct or an incorrect position of the temperature sensor.

10 Claims, 5 Drawing Sheets

(58) Field of Classification Search
CPC .. G01K 15/00; G01K 15/007; G01K 2205/04; G01K 3/10
See application file for complete search history.

(56) References Cited

U.S. PATENT DOCUMENTS

| | | | | |
|---|---|---|---|---|
| 2006/0089783 A1* | 4/2006 | Braun | ............... | F01N 11/005 |
| | | | | 701/114 |
| 2007/0144146 A1* | 6/2007 | Kusatsugu | ............ | F01N 11/00 |
| | | | | 60/277 |
| 2007/0286259 A1* | 12/2007 | Kwon | ................ | G01K 15/00 |
| | | | | 374/170 |
| 2013/0327018 A1* | 12/2013 | Tylutki | ............... | F02D 41/222 |
| | | | | 60/274 |
| 2016/0356193 A1* | 12/2016 | Rodatz | ............... | F01N 11/002 |

OTHER PUBLICATIONS

Written Opinion dated May 28, 2018 in corresponding PCT International Application No. PCT/SE2018/050158.

* cited by examiner

SYSTEM AND A METHOD FOR DETERMINING A CORRECT OR INCORRECT POSITION OF A TEMPERATURE SENSOR OF AN EMISSION CONTROL SYSTEM

CROSS-REFERENCE TO RELATED APPLICATIONS

The present application is a 35 U.S.C. § 371 national phase conversion of PCT/SE2018/050158, filed Feb. 19, 2018, which claims priority of Swedish Patent Application No. 1750166-9, filed Feb. 20, 2017, the contents of all of which are incorporated herein by reference. The PCT International Application was published in the English language.

FIELD OF INVENTION

The present invention relates to a method for determining a correct or an incorrect position of a temperature sensor for measuring a prevailing temperature in an emission control system of a combustion engine The invention also relates to a computer program product comprising program code stored on a computer-readable medium for implementing a method according to the invention.

The invention further relates to a system for determining a correct or an incorrect position of a temperature sensor for measuring a prevailing temperature in an emission control system of a combustion engine

BACKGROUND ART

In emission control systems of a combustion engine at least one temperature sensor is often provided so as to measure a prevailing temperature of exhaust gases from said engine. This is a common configuration of emission control systems of vehicles, such as trucks and buses. The temperature measurement is a basis for controlling the operation of said emission control system as well as other system devices of the vehicle. It is of outmost importance to detect a correct prevailing temperature of the exhaust gases for proper operation of the vehicle.

Such temperature sensors are arranged so as to measure the exhaust gas temperature at various positions of the emission control system. One way of arranging the temperature sensors is by means of threaded holes in a body of the emission control system. Hereby a sensor head of the temperature sensor is provided in an exhaust gas flow from said engine. It has however been found out that tampering of said temperature sensors is at hand, whereby laws and regulations may be violated due to improper operation of the vehicle if false temperature values of the exhaust gas is detected. One way of tampering with said temperature sensors is to arrange a so called nipple in the threaded hole of the body of the emission control system and then arrange the temperature sensor at said nipple. A nipple can be described as a threaded pipe, which can be connected to the temperature sensor and connected to the body of the emission control system. Hereby, the position of the temperature sensor is dislocated (substantially perpendicularly relative the body of the emission control system). The temperature sensor is hereby provided at a position where it is not detecting the actual temperature of the exhaust gas but another, lower, temperature. This measured temperature may thus relate to a temperature of the body of the emission control system or a temperature of the surroundings of the emission control system. By providing this false temperature measurement to a control unit, the control unit will control various systems of the vehicle in an inadequate manner. For example, if a temperature of the exhaust gas is falsely detected (too low temperature value) the control unit may dose too little reductant to an SCR-system (Selective Catalytic Reduction) of the emission control system, which will lead to high emissions and possible violations of environmental regulations.

One way of determining tampering of a temperature sensor for measuring a temperature of an emission control system is to compare a sensor temperature value with a model temperature value, which model temperature value is generated by a model for estimating the relevant temperature of concern. If the sensor temperature value is differing from the model temperature value to a certain extent, typically 50-100 degrees Celsius, the temperature sensor is typically considered to have been tampered and an error code is generated. However, due to the fact that the models used are associated with a number of limitations, e.g. referring to thermal inertia modelling of the emission control system, the model temperature value generated may not be accurate. If a faulty positioned temperature sensor of the emission control system is not detected, the control unit may use an inadequate temperature value for controlling, for example, the dosing of reductant to an SCR-system, which may lead to too high levels of $NO_x$ being transported out of the emission control system.

SUMMARY OF THE INVENTION

An object of the present invention is to propose a novel and advantageous method for determining a correct or an incorrect position of a temperature sensor for measuring a prevailing temperature in an emission control system of a combustion engine.

Another object of the invention is to propose a novel and advantageous system and a novel and advantageous computer program for determining a correct or an incorrect position of a temperature sensor for measuring a prevailing temperature in an emission control system of a combustion engine.

Another object of the present invention is to propose a novel and advantageous method that provides a cost effective and reliable determination of a correct or an incorrect position of a temperature sensor for measuring a prevailing temperature in an emission control system of a combustion engine.

Another object of the invention is to propose a novel and advantageous system and a novel and advantageous computer program that provide a cost effective and reliable determination of a correct or an incorrect position of a temperature sensor for measuring a prevailing temperature in an emission control system of a combustion engine.

Yet another object of the invention is to propose a method, a system and a computer program that achieve a robust, accurate and automated determination of a correct or an incorrect position of a temperature sensor for measuring a prevailing temperature in an emission control system of a combustion engine.

Yet another object of the invention is to propose an alternative method, an alternative system and an alternative computer program that determine a correct or an incorrect position of a temperature sensor for measuring a prevailing temperature in an emission control system of a combustion engine.

Some of these objects are achieved with a method and a system according to the independent claims. Advantageous embodiments are depicted in the dependent claims.

Substantially the same advantages of the innovative method are valid for the innovative system.

According to an example embodiment there is provided a method for determining a correct or incorrect position of a temperature sensor for measuring a prevailing temperature in an emission control system of a combustion engine, comprising the steps of:
- determining a first reference temperature within a first temperature interval;
- measuring a first temperature by means of said temperature sensor corresponding to said first temperature interval;
- determining a second reference temperature within a second temperature interval, wherein said second temperature interval differs from said first temperature interval;
- measuring a second temperature by means of said temperature sensor corresponding to said second temperature interval;
- determining a value for a characteristic parameter based on said first reference temperature, said first measured temperature, said second reference temperature and said second measured temperature;
- comparing said determined value for said characteristic parameter with a predetermined characteristic parameter threshold value, said predetermined characteristic parameter threshold value being based upon determined operation parameter results for different positions of said temperature sensor for predetermined engine operation characteristics; and
- based upon said comparison, determining a correct or an incorrect position of said temperature sensor.

Said incorrect position of said temperature sensor herein relates to the use of a so called nipple, or similar device, when mounting said temperature sensor at said emission control system. By attaching said temperature sensor to said nipple the sensor is dislocated from an intended and proper position for temperature measurements. Hereby said temperature sensor is not positioned for proper measurements and will in fact detect lower temperatures than the actual prevailing temperature of the emission control system. Advantageously it is possible to detect such tampering with the temperature sensor according to the inventive method.

According to an embodiment said first temperature interval differs considerably from said second temperature interval. The first temperature interval and the second temperature interval may differ such that they do not overlap. The first temperature interval and the second temperature interval may alternatively partially overlap, but the measured first and second temperatures and the first and second reference temperatures should always be different. The first temperature interval may be an interval of lower temperatures than the second temperature interval. The first reference temperature and the first measured temperature may thus be lower than the second reference temperature and the second measured temperature.

The steps of determining a first reference temperature within a first temperature interval and measuring a first temperature by means of said temperature sensor may be performed before determining a second reference temperature within a second temperature interval and measuring a second temperature. Alternatively, the steps of determining a second reference temperature within a second temperature interval and measuring a second temperature are performed before determining a first reference temperature within a first temperature interval and measuring a first temperature.

Said prevailing temperature in the emission control system of a combustion engine according to an embodiment relates to a prevailing temperature of exhaust gas generated by said combustion engine.

Said first reference temperature and said second reference temperature may be determined by means of a model estimating the temperature of the exhaust gas at the position of the temperature sensor. The model, and thus the reference temperature, is based on the prevailing operating conditions. At a certain operating condition, the model will provide a specific reference temperature. It may thus be known that at certain operating conditions the model will provide a relatively low reference temperature respectively a relatively high reference temperature. The method thus suitably comprises determining that the operating conditions are such that the model would provide a reference temperature within a first temperature interval and then determining the first reference temperature. A first temperature is subsequently measured by means of the temperature sensor. Likewise, the method suitably comprises determining that the operating conditions are such that the model would provide a reference temperature within a second temperature interval, different from the first temperature interval, and then determining the second reference temperature.

By determining said value for a characteristic parameter based on measured temperatures and reference temperatures at different temperature intervals, both at lower temperatures and at higher temperatures, it can be determined if the temperature sensor has an incorrect position or if there simply is an offset error in the model or offset in the temperature sensor caused by tampering or fault. A temperature sensor tampered by means of a nipple will provide temperature values that are lower than the actual temperature and thus lower than the reference temperature estimated for example by means of a model. However, at low temperatures, a temperature sensor tampered by means of a nipple will provide essentially the same temperature as the model while an offset error would result in a difference between the measured temperature and the reference temperature also at low temperatures. For example, a temperature sensor tampered by means of a nipple may provide essentially the same temperature as the model at temperatures around 100 degrees Celsius. The first temperature interval may thus be around 100 degrees Celsius.

The method may comprise determining more than two reference temperatures and measured temperatures. The method may thus comprise determining a third reference temperature and to measure a third temperature. The characteristic parameter value may thus be determined based on more than two reference temperatures and measured temperatures.

The inventive method may comprise the step of, if it has been determined that the temperature sensor is incorrectly positioned, adapting/correcting the temperature sensor signal so as to provide a more correct prevailing temperature value corresponding to the emission control system of a combustion engine According to an example the method may comprise the step of:
- determining that there is only a minor difference between said first reference temperature and said first measured temperature.

The method may thus comprise the step of determining that the first reference temperature and the first measured temperature are essentially similar. An offset error can thereby be ruled out and the method may continue. According to an example the method is ended if there is a considerable difference between the first measured temperature and the first reference temperature. If an offset is identified by comparing the first reference temperature and the first measured temperature, the method may comprise subtracting the offset from the measured temperature value and continue the method. This may be useful if the temperature sensor has both an offset and also has been tampered.

Said value for the characteristic parameter may be determined based on the relationship between the first measured temperature and the first reference temperature and the second measured temperature and the second reference temperature. Said relationship may be compiled in a graph with measured temperatures on the y-axis and reference temperatures on the x-axis.

According to an example the method may comprise the step of:
determining the slope of a graph showing the relationship between the measured temperatures and the reference temperatures, as said characteristic parameter value.

According to an example the method may comprise the step of:
determining a slope of a graph connecting a coordinate specifying said first reference temperature and said first measured temperature, in a measured temperature/reference temperature coordinate system, and a coordinate specifying said second reference temperature and said second measured temperature in said coordinate system, as said characteristic parameter value.

Said characteristic parameter may thus be the slope of a graph in a measured temperature/reference temperature coordinate system, the graph connecting a coordinate specifying said first reference temperature and said first measured temperature, and a coordinate specifying said second reference temperature and said second measured temperature. Irrespective of whether the temperature sensor has a correct position or an incorrect position due to a nipple, the relationship between the measured temperatures and the reference temperatures corresponds to an essentially linear function. That is, the measured temperature will be the actual temperature (reference temperature) multiplied with a certain factor. This factor may be referred to as the gain factor. Determining the slope of the graph may thus comprise determining the gain factor. When the temperature sensor has a correct position the measured temperatures should be essentially the same as the reference temperatures. The gain factor should thus be essentially 1 when no tampering has occurred. However, if the temperature sensor has been tampered by means of a nipple, the gain factor will be lower, for example, around 0.5.

Said characteristic parameter value may alternatively be determined as a geometric/algebraic expression determined based on the relationship between the first measured temperature and the first reference temperature and the second measured temperature and the second reference temperature. Determining the value for a characteristic parameter may thus comprise determining an angle formed between the graph showing the relationship between the measured temperatures and the reference temperatures, and a line parallel with the x-axis in the coordinate system. It is to be understood that the coordinate system mentioned herein is only an example and said characteristic parameter value may be expressed in any coordinate system.

Said predetermined characteristic parameter threshold value may be based on a relationship between said characteristic parameter and a predetermined operating parameter. If the determined characteristic parameter value is lower than the predetermined characteristic parameter threshold value, it is suitably determined that the temperature sensor has an incorrect position. A determined characteristic parameter value that is higher than the threshold value, for example, higher than 1, may be used to determine some other faults. Such other faults could for example be an incorrect reference temperature due to a defective upstream sensor or an inaccurate combustion etc.

Said predetermined characteristic parameter threshold value may be empirically determined by measuring a predetermined operating parameter when the temperature sensor has a correct position as well as when the temperature sensor has an incorrect position due to a nipple. The predetermined operating parameter suitably relates to the emission control system. Typically nipples of different lengths are used to thereby determine when, at which length and thus at which position of the temperature sensor, the measured operating parameter exceeds or falls below a determined threshold. The position of the temperature sensor that results in the operating parameter exceeding or falling below the threshold thus corresponds to the predetermined characteristic parameter threshold. A relationship between the characteristic parameter and the operating parameter may thereby be achieved. Said predetermined characteristic parameter threshold value may be based on the determined operation parameter results relating to $NO_x$-conversion, $NO_x$-emission, vaporizing performance of urea in a vaporizing module upstream of an SCR-catalyst, formation of nitrous oxide, performance of $NH_3$-conversion in an Ammonia Slip Catalyst (ASC) or NO to $NO_2$ conversion in a DOC-unit.

By the herein mentioned method a robust and accurate method for diagnosing a temperature sensor is achieved. With the inventive method common offset errors in the model for estimating the temperature do not affect the diagnosing, and a more reliable method is thus achieved.

According to one example embodiment there is provided a method for determining a correct or incorrect position of a temperature sensor for measuring a prevailing temperature in an emission control system of a combustion engine, comprising the steps of:
determining a first reference temperature within a first temperature interval;
measuring a first temperature by means of said temperature sensor corresponding to said first temperature interval;
determining a second reference temperature within a second temperature interval, wherein said second temperature interval differs from said first temperature interval;
measuring a second temperature by means of said temperature sensor corresponding to said second temperature interval;
determining a value for a characteristic parameter corresponding to said first reference temperature and said first measured temperature and to said second reference temperature and said second measured temperature;
comparing said determined value for said characteristic parameter with a predetermined characteristic parameter threshold value, said predetermined characteristic parameter threshold value being based upon determined $NO_x$-conversion results for different positions of said temperature sensor for predetermined engine operation characteristics; and
based upon said comparison, determining a correct or an incorrect position of said temperature sensor.

According to one embodiment there is provided a system for determining a correct or an incorrect position of a temperature sensor for measuring a prevailing temperature in an emission control system of a combustion engine, comprising:
- means arranged for determining a first reference temperature within a first temperature interval;
- means arranged for measuring a first temperature by means of said temperature sensor corresponding to said first temperature interval;
- means arranged for determining a second reference temperature within a second temperature interval, wherein said second temperature interval differs from said first temperature interval;
- means arranged for measuring a second temperature by means of said temperature sensor corresponding to said second temperature interval;
- means arranged for determining a value for a characteristic parameter based on said first reference temperature, said first measured temperature, said second reference temperature and said second measured temperature;
- means arranged for comparing said determined value for said characteristic parameter with a predetermined characteristic parameter threshold value, said predetermined characteristic parameter threshold value being based upon determined operation parameter results for different positions of said temperature sensor for predetermined engine operation characteristics; and
- means arranged for, based upon said comparison, determining a correct or an incorrect position of said temperature sensor.

It will be appreciated that all the embodiments described for the method aspect of the invention are also applicable to the system aspect of the invention. That is, the system may be configured to perform any one of the steps of the method according to various embodiments described herein.

The system may comprise:
- means arranged for determining that there is only a minor difference between said first reference temperature and said first measured temperature.

The system may comprise:
- means arranged for determining a slope of a graph connecting a coordinate specifying said first reference temperature and said first measured temperature, in a measured temperature/reference temperature coordinate system, and a coordinate specifying said second reference temperature and said second measured temperature in said coordinate system, as said characteristic parameter value.

According to an example embodiment there is provided a system for determining a correct or an incorrect position of a temperature sensor for measuring a prevailing temperature in an emission control system of a combustion engine, comprising:
- means arranged for determining a first reference temperature within a first temperature interval;
- means arranged for measuring a first temperature by means of said temperature sensor corresponding to said first temperature interval;
- means arranged for determining a second reference temperature within a second temperature interval, wherein said second temperature interval differs from said first temperature interval;
- means arranged for measuring a second temperature by means of said temperature sensor corresponding to said second temperature interval;
- means arranged for determining a value for a characteristic parameter corresponding to said first reference temperature and said first measured temperature and to said second reference temperature and said second measured temperature;
- means arranged for comparing said thus determined value for said characteristic parameter with a predetermined characteristic parameter threshold value, said predetermined characteristic parameter threshold value being based upon determined $NO_x$-conversion results for different positions of said temperature sensor for predetermined engine operation characteristics; and
- means arranged for, based upon said comparison, determining a correct or an incorrect position of said temperature sensor.

According to an aspect of the invention there is provided a vehicle comprising a system according to what is presented herein. Said vehicle may be any from among a truck, bus or passenger car. According to an embodiment the system is provided for a marine application or industrial application.

According to an aspect of the invention there is provided a computer program for determining a correct or an incorrect position of a temperature sensor for measuring a prevailing temperature in an emission control system of a combustion engine, wherein said computer program comprises program code for causing an electronic control unit or a computer connected to the electronic control unit to perform anyone of the method steps depicted herein, when run on said electronic control unit or said computer.

According to an aspect of the invention there is provided a computer program for determining a correct or an incorrect position of a temperature sensor for measuring a prevailing temperature in an emission control system of a combustion engine, wherein said computer program comprises program code stored on a computer-readable medium for causing an electronic control unit or a computer connected to the electronic control unit to perform anyone of the method steps depicted herein.

According to an aspect of the invention there is provided a computer program for determining a correct or an incorrect position of a temperature sensor for measuring a prevailing temperature in an emission control system of a combustion engine, wherein said computer program comprises program code stored on a computer-readable medium for causing an electronic control unit or a computer connected to the electronic control unit to perform anyone of the method steps depicted herein, when run on said electronic control unit or said computer.

According to an aspect of the invention there is provided a computer program product containing a program code stored on a computer-readable medium for performing anyone of the method steps depicted herein, when said computer program is run on an electronic control unit or a computer connected to the electronic control unit.

According to an aspect of the invention there is provided a computer program product containing a program code stored, in a non-volatile manner, on a computer-readable medium for performing anyone of the method steps depicted herein, when said computer program is run on an electronic control unit or a computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and in which.

DETAILED DESCRIPTION

Figure 1:
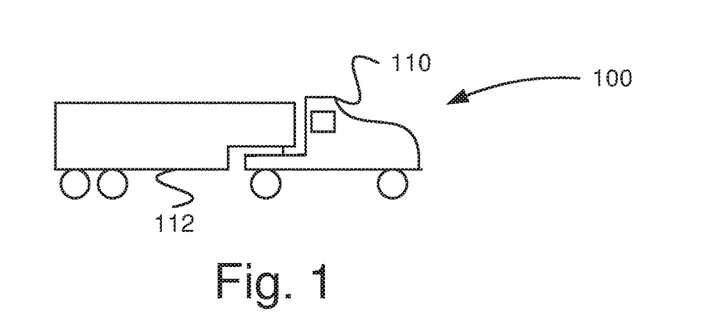
FIG. 1 schematically illustrates a vehicle according to an embodiment of the invention.

FIG. 1 depicts a side view of a vehicle 100. The exemplified vehicle 100 comprises a tractor unit 110 and a trailer 112. The vehicle 100 may be a heavy vehicle, e.g. a truck or a bus. It may alternatively be a car.

It should be noted that the inventive system is applicable to various vehicles, such as e.g. a mining machine, tractor, dumper, wheel-loader, platform comprising an industrial robot, forest machine, earth mover, road construction vehicle, road planner, emergency vehicle or a tracked vehicle.

It should be noted that the invention is suitable for application in various systems comprising a combustion engine and an associated emission control system. The invention is suitable for application in various systems comprising a combustion engine and a catalytic configuration. Said catalytic configuration may comprise at least one SCR-unit. Said catalytic configuration may comprise one or more DOC-units, DPF-units (Diesel Particulate Filter), ASC-units, $NO_x$-absorber and SCR-units. It should be noted that the invention is suitable for application in any catalytic configuration and is therefore not confined to catalytic configurations for motor vehicles. The innovative method and the innovative system according to one aspect of the invention are well suited to other platforms which comprise a combustion engine and a catalytic configuration than motor vehicles, e.g. watercraft. The watercraft may be of any kind, e.g. motorboats, steamers, ferries or ships.

The innovative method and the innovative system according to one aspect of the invention are also well suited to, for example, systems which comprise industrial combustion engines and/or combustion engine-powered industrial robots and an associated emission control system comprising a catalytic configuration.

The innovative method and the innovative system according to one aspect of the invention are also well suited to various kinds of power plants, e.g. an electric power plant which comprises a combustion engine-powered generator and an associated emission control system comprising a catalytic configuration.

The innovative method and the innovative system are also well suited to various combustion engine systems comprising a catalytic configuration.

The innovative method and the innovative system are well suited to any engine system which comprises an engine, e.g. on a locomotive or some other platform, an associated emission control system comprising a catalytic configuration.

The innovative method and the innovative system are well suited to any system which comprises a $NO_x$-generator and an associated emission control system comprising a catalytic configuration.

The term "link" refers herein to a communication link which may be a physical connection such as an optoelectronic communication line, or a non-physical connection such as a wireless connection, e.g. a radio link or microwave link.

The term "reductant" or "reducing agent" refers herein to an agent used for reacting with certain emissions in an SCR system. These emissions may for example be $NO_x$ gas. The terms "reductant" and "reducing agent" are herein used synonymously. In one version, said reductant is the so-called AdBlue. Other kinds of reductants may of course be used. AdBlue is herein cited as an example of a reductant, but one skilled in the art will appreciate that the innovative method and the innovative system are feasible with other types of reductants.

The term "fuel" refers herein to any fuel for powering an engine having an associated emission control system comprising a catalytic configuration. Fuel may also, where applicable, be supplied to the emission control system downstream of said engine so as to control a prevailing temperature of the exhaust gas and thus the catalytic configuration. Said fuel may comprise diesel, gasoline or ethanol, or any other suitable fuel.

Figure 2A:
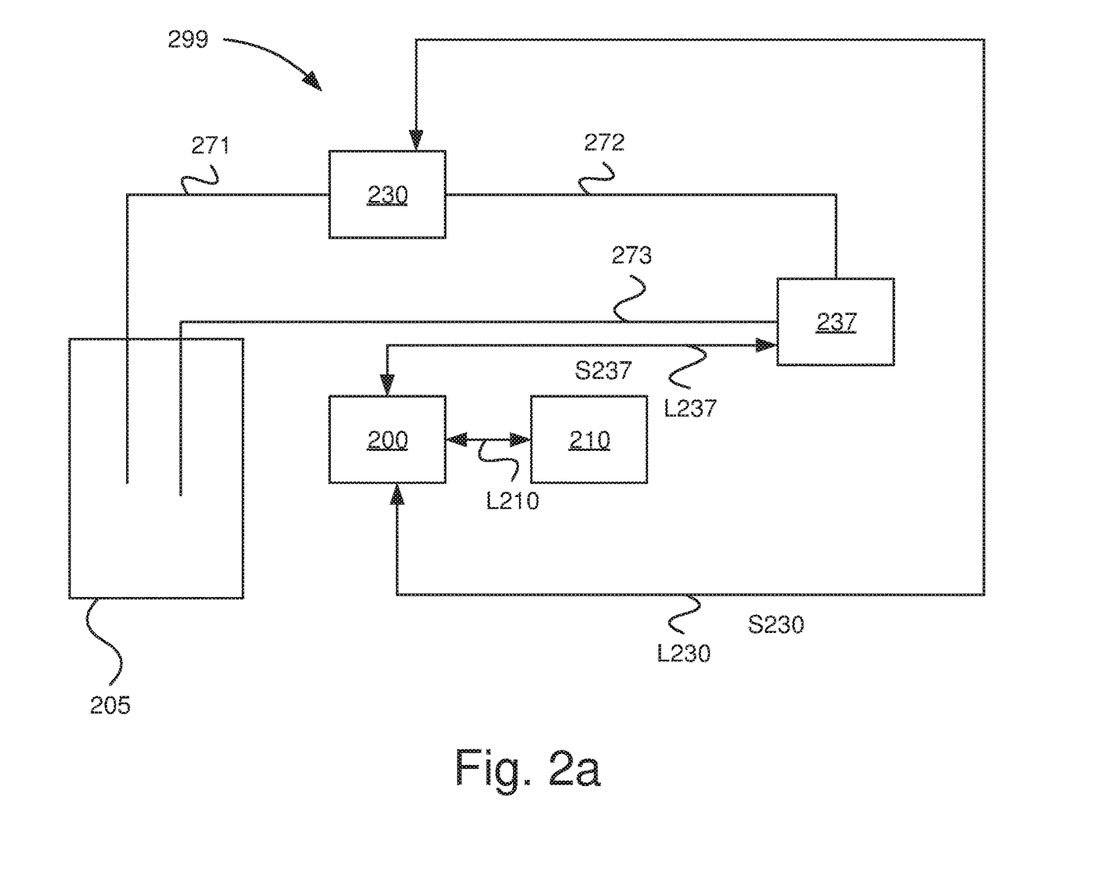
FIG. 2a schematically illustrates a system according to an embodiment of the invention.

The term "line" with regard to FIG. 2a refers to a passage for holding and conveying a fluid, e.g. a reducing agent in liquid form. The line may be a pipe of any size and be made of any suitable material, e.g. plastic, rubber or metal.

FIG. 2a schematically illustrates a system 299 according to an example embodiment of the invention. The system 299 is situated in the tractor unit 110 and may be part of a catalytic configuration, also denoted exhaust gas processing configuration. It comprises in this example a container 205 arranged to hold a reductant. The container 205 is adapted to hold a suitable amount of reductant and also to be replenished as necessary.

A first line 271 is provided to lead the reductant to a pump 230 from the container 205. The pump 230 may be any suitable pump. The pump 230 may be arranged to be driven by an electric motor (not depicted). The pump 230 may be adapted to draw the reductant from the container 205 via the first line 271 and supplying it via a second line 272 to a dosing unit 237. The dosing unit 237 may also be referred to as a reducing agent dosing unit. The dosing unit 237 comprises an electrically controlled dosing valve by means of which a flow of reductant added to the exhaust system can be controlled. The pump 230 is adapted to pressurize the reductant in the second line 272. The dosing unit 237 is provided with a throttle unit, against which said pressure of the reductant may build up in the system 299.

A first control unit 200 is arranged for communication with the pump 230 via a link L230. The first control unit 200 is arranged to send control signals S230 via said link L230.

The first control unit 200 is arranged to control the operation of said pump 230 so as to, for example, adjust flows of the reducing agent within the system 299. The first control unit 200 is arranged to control an operation power of the pump 230 e.g. by controlling the electric motor.

The dosing unit 237 is adapted to supply said reductant to an exhaust system (see FIG. 2b) of the vehicle 100. More specifically, it is adapted to supply a suitable amount of reductant in a controlled way to an exhaust system of the vehicle 100. In this version, one SCR catalyst (see FIG. 2b) is situated downstream of the location in the exhaust system where the supply of reductant takes place.

A third line 273 running between the dosing unit 237 and the container 205 is adapted to lead back to the container 205 a certain amount of the reductant fed to the dosing unit 237. This configuration results in advantageous cooling of the dosing unit 237. The dosing unit 237 is thus cooled by a flow of the reductant when it is pumped through it from the pump 230 to the container 205.

The first control unit 200 is arranged for communication with the dosing unit 237 via a link L237. The first control unit 200 is arranged to send control signals 5237 via said link L237. The first control unit 200 is arranged to control operation of said dosing unit 237 so as to for example control dosing of the reducing agent to the exhaust gas system of the vehicle 100. The control unit 200 is arranged to control the operation of the dosing unit 237 so as to for example adjust return flow of said reducing agent to the container 205.

A second control unit 210 is arranged for communication with the first control unit 200 via a link L210. It may be releasably connected to the first control unit 200. It may be a control unit external to the vehicle 100. It may be adapted to performing the innovative steps according to the invention. It may be used to cross-load software to the first control unit 200, particularly software for applying the innovative method. It may alternatively be arranged for communication with the first control unit 200 via an internal network on board the vehicle. It may be adapted to performing functions corresponding to those of the first control unit 200, such as e.g. determining a correct or an incorrect position of a temperature sensor for measuring a prevailing temperature in an emission control system of a combustion engine.

Figure 2B:
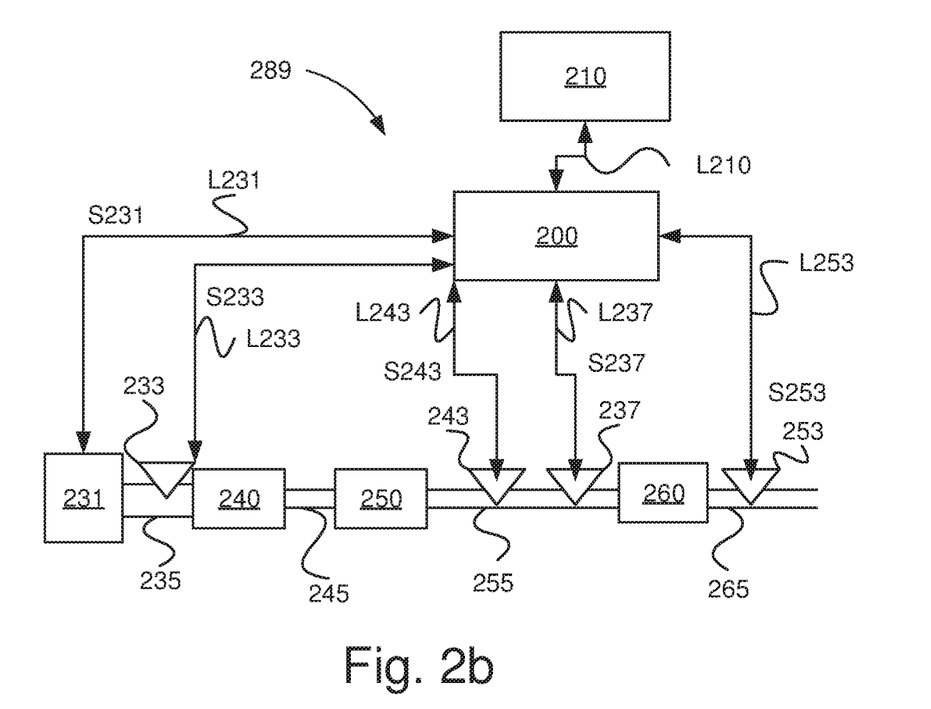
FIG. 2b schematically illustrates a system according to an embodiment of the invention.

FIG. 2b schematically illustrates a system 289 of the vehicle shown in FIG. 1 according to an embodiment of the invention. The system 289 may constitute a part of the inventive system for determining a correct or an incorrect position of a temperature sensor for measuring a prevailing temperature in an emission control system of a combustion engine.

A combustion engine 231 is during operation causing an exhaust gas flow which is lead via a first passage 235 to a DOC-unit 240. A second passage 245 is arranged to convey said exhaust gas flow from said DOC-unit 240 to a DPF-unit 250. A third passage 255 is arranged to convey said exhaust gas flow from said DPF-unit 250 to an SCR-unit 260. A fourth passage 265 is arranged to convey said exhaust gas flow from said SCR-unit 260 to an environment of the catalytic configuration. The catalytic configuration may comprise any of said components downstream said engine 231, including at least one member presenting catalytic features. The catalytic configuration may comprise any of said components downstream said engine 231, including at least one member presenting catalytic features being sensitive for sulphur poisoning. The system 289 may also comprise an ACS-unit (not shown) downstream of the SCR-unit 260.

Said dosing unit 237 as disclosed in FIG. 2a is arranged to provide said reductant to said third passage 255 upstream of said SCR-unit 260 and downstream of said DPF-unit 250. The first control unit 200 is arranged to control the operation of said dosing unit 237 so as to, where applicable, dose reducing agent into the third passage 255.

Said SCR-unit 260 may comprise a vaporizing module (not shown) which is arranged to vaporize said dosed reducing agent so as to achieve a mixture of exhaust gas and reducing agent for treatment by means of an SCR-portion of the SCR-unit 260. Said vaporizing module may comprise a mixer (not shown) for mixing said vaporized reducing agent with the exhaust gas. Said vaporizing module may be formed in any suitable way. Said vaporizing module is configured to achieve a most possibly effective vaporizing of the provided reducing agent.

Herein said vaporizing module is providing large surfaces where vaporizing of provided reducing agent may be performed in an effective way. Said vaporizing module may consist of a metal or a metal alloy.

A first $NO_x$-sensor 233 is arranged upstream of said DOC-unit 240 at said first passage 235. Said first $NO_x$-sensor 233 is arranged for communication with the first control unit 200 via a link L233. The first $NO_x$-sensor 233 is arranged to continuously determine a prevailing first content of NO in the first passage 235. The first $NO_x$-sensor 233 is arranged to continuously send signals 5233 comprising information about the prevailing first content of NO to the first control unit 200 via the link L233.

A second $NO_x$-sensor 253 is arranged downstream of said SCR-unit 260 at said fourth passage 265. Said second $NO_x$-sensor 253 is arranged for communication with the first control unit 200 via a link L253. The second $NO_x$-sensor 253 is arranged to continuously determine a prevailing second content of NO in the fourth passage 265. The second $NO_x$-sensor 253 is arranged to continuously send signals 5253 comprising information about the prevailing second content of NO to the first control unit 200 via the link L253.

Said first $NO_x$-sensor 233 and said second $NO_x$-sensor 253 may be used to provide information about prevailing contents of NO in the first passage 235 and the fourth passage 265, respectively.

According to an example said first control unit 200 is arranged to determine said first content of $NO_x$ according to a model stored in a memory thereof. Hereby said first control unit is arranged to continuously or intermittently determine/estimate/model/calculate a prevailing $NO_x$ content in said first passage 235. This model may be based on parameters such as engine speed RPM, engine load, dosed amount of fuel to said engine 231, etc.

Said first control unit 200 may be arranged to continuously or intermittently determine a course of a $NO_x$-conversion ratio on the basis of said determined first $NO_x$-content and said determined second $NO_x$-content.

A temperature sensor 243 is arranged at the third passage 255. Said temperature sensor 243 is arranged for communication with said first control unit 200 via a link L243. Said temperature sensor 243 may be arranged to continuously measure a prevailing temperature T_sensor of the exhaust gas in said third passage 255 and send signals 5243 comprising information about said measured temperature T_sensor to said first control unit 200 via said link L243. Hereby it is illustrated that said temperature sensor 243 is arranged upstream of said dosing unit 237 at the third passage 255. According to another example said temperature sensor 243 is arranged downstream of said dosing unit 237 at the third passage 255. According to another example two temperature sensors may be provided at said third passage 255, wherein one temperature sensor may be positioned upstream of said dosing unit 237 and one temperature sensor may be positioned downstream of said dosing unit 237. According to this example the first control unit 200 may use a mean value of temperature values detected by means of said two temperature sensors at the third passage 255. Said temperature sensor 243 may be arranged downstream of the SCR-unit/ASC-unit. Said temperature sensor 243 may be arranged at any other position downstream of the combustion engine 231.

According to an example said first control unit 200 is arranged to determine a prevailing reference temperature T_ref of said exhaust gas for example at the location of the temperature sensor 243. Said reference temperature T_ref may be determined based on a model stored in a memory of the control unit 200. Said reference temperature T_ref may be determined based on measured temperatures upstream of the temperature sensor 243. Hereby said first control unit 200 may be arranged to continuously or intermittently determine/estimate/model/calculate a prevailing reference temperature T_ref of said exhaust gas in said third passage 255. The model may be based on parameters such as engine speed RPM, engine load, dosed amount of fuel to said engine 231, etc.

Said first control unit 200 is arranged to control the temperature of the exhaust gas flow from said engine 231 by any suitable means.

Said first control unit 200 is arranged to perform the method steps depicted herein, comprising the method steps which are detailed with reference to FIG. 4*b*.

Figure 3:
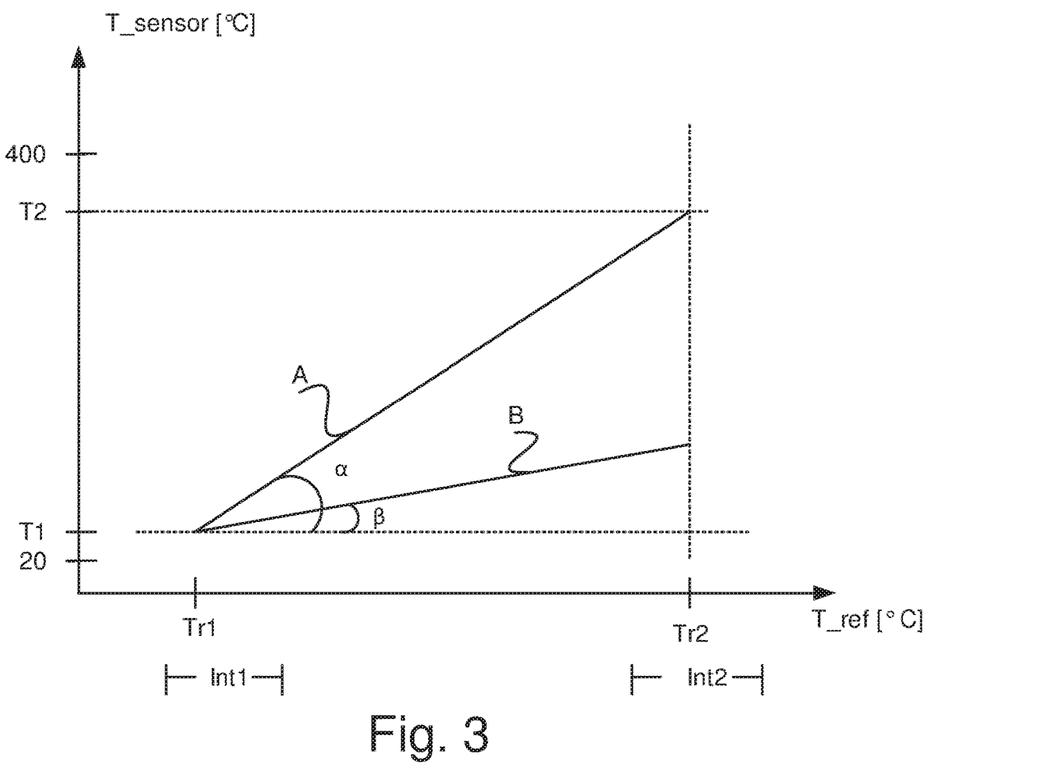
FIG. 3 schematically illustrates a diagram according to an aspect of the invention.
Figure 4A:
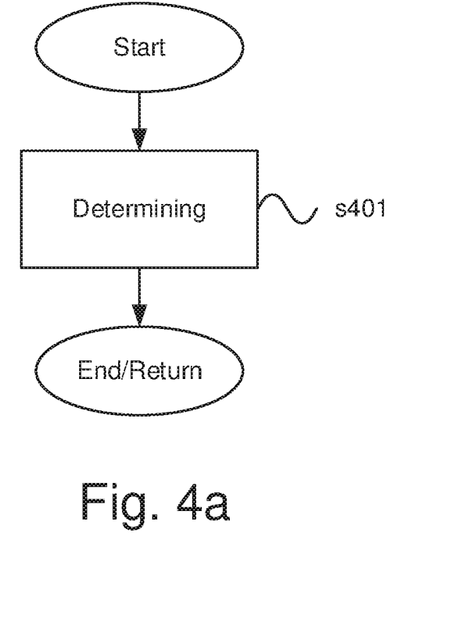
FIG. 4a is a schematic flowchart of a method according to an embodiment of the invention.

FIG. 3 schematically illustrates a diagram according to an aspect of the invention. The diagram shows relationships between a measured temperature T_sensor and a reference temperature T_ref in different situations. The x-axis shows the reference temperature and the y-axis shows the measured temperature. The diagram thus shows a measured temperature/reference temperature coordinate system. The diagram relates to the inventive method for determining a correct or an incorrect position of a temperature sensor for measuring a prevailing temperature in an emission control system as depicted in FIGS. 4*a* and 4*b*. The temperature sensor may be the temperature sensor 243 as disclosed in FIG. 2*b*.

Graph A illustrates a relationship between the measured temperatures and the reference temperatures when the temperature sensor 243 has a correct position and graph B illustrates the relationship between the measured temperatures and the reference temperatures when the temperature sensor 243 has been tampered by using a nipple.

A first reference temperature Tr1 has been determined within a first temperature interval Int1. Said first reference temperature Tr1 may have been determined based on a model as mentioned in relation to FIG. 2*b*. The reference temperature achieved by means of the model may depend on the operational condition and a certain operational condition may thus provide a certain reference temperature at a certain location in the emission control system. The first reference temperature Tr1 is suitably determined during an operational condition known to result in a reference temperature within the first temperature interval Int1. A first measured temperature T1 is also measured by means of the temperature sensor 243. The first reference temperature Tr1 and the first measured temperature T1 suitably relate to the same location in the emission control system. The first reference temperature Tr1 and the first measured temperature T1 are essentially the same and constitute the starting point of both graph A and graph B. That the first reference temperature Tr1 and the first measured temperature T1 are essentially similar indicates that it cannot be an offset error in the model or the method for determining the reference temperatures. If the temperature sensor 243 is faulty or tampered with, such that there is an offset, there would be an offset error also at low reference temperatures.

A second reference temperature Tr2 for the same location in the emission control system has also been determined within a second temperature interval Int2. The second reference temperature Tr2 is suitably determined during an operational condition known to result in a reference temperature within the second temperature interval Int2. The second temperature interval Int2 at least partly differs from the first temperature interval Int1 and the second reference temperature Tr2 differs from the first reference temperature Tr1. The second temperature interval Int2 is suitably higher than the first temperature interval Int1. A second measured temperature T2 is also measured by means of the temperature sensor 243.

In the situation where the temperature sensor 243 has a correct position the second measured temperature T2 and the second reference temperature Tr2 are essentially the same. Thus, graph A has a slope which is essentially 1. However, in the situation where the temperature sensor has been tampered by using a nipple the second measured temperature T2 will be lower than the second reference temperature Tr2 as illustrated in graph B. Graph B thus has a slope which is lower than 1. The longer the nipple, the larger is the displacement of the temperature sensor 243 and the lower will the second measured temperature T2 be, compared to the second reference temperature Tr2.

There could be some difference between the measured temperatures and the reference temperatures even if the temperature sensor is not tampered by means of a nipple so only comparing for example the second measured temperature T2 with the second reference temperature Tr2 is not a reliable way of determining if the temperature sensor has a correct or incorrect position. When only comparing one measured/reference temperature offset errors cannot be ruled out. Instead at least two measured/reference temperatures are determined and the linear function achieved is used. A value for a characteristic parameter is suitably determined based on the relationship between the first measured temperature T1 and the first reference temperature Tr1 and the second measured temperature T2 and the second reference temperature Tr2. Said value may be the slope of the linear function showing the relationship between the measured temperatures and the reference temperatures. Irrespective of whether the temperature sensor has a correct or an incorrect position the measured temperature will be the actual temperature (reference temperature) multiplied with a certain factor. This factor may be referred to as the gain factor. The gain factor corresponds to the slope of the graph. The gain factor should thus be essentially 1 when no tampering has occurred as illustrated in graph A and the gain factor should be considerably lower than 1 if the temperature sensor has been tampered by means of a nipple as illustrated in graph B.

Said value for a characteristic parameter may be determined as a geometric/algebraic expression determined based on the relationship between the first measured temperature T1 and the first reference temperature Tr1 and the second measured temperature T2 and the second reference temperature Tr2. The graph showing said relationship (graph A, graph B) can be seen as the hypotenuse of a triangle formed together with lines parallel with the x-axis and the y-axis. Said value may thus be the angle between the graph (the hypotenuse) and the line parallel with the x-axis. In the example shown in FIG. 3 graph A has an angle α and graph B has an angle β. When the temperature sensor 243 has been tampered, the angle will be lower than when the temperature sensor 243 has a correct position. Said characteristic parameter value may alternatively relate to the area of the formed triangle.

To determine if the temperature sensor 243 has a correct or an incorrect position the determined characteristic parameter value is compared with a predetermined characteristic parameter threshold value. If the determined characteristic parameter value is lower than the predetermined characteristic parameter threshold value it is determined that the temperature sensor 243 has an incorrect position. Said predetermined characteristic parameter threshold value may be based on a relationship between a specific operating parameter and said characteristic parameter. The operating parameter relates to the emission control system. The operating parameter may for example be $NO_x$-conversion, $NO_x$-emission, vaporizing performance of a vaporizing module upstream of an SCR-unit, formation of nitrous oxide, or NO to $NO_2$ conversion in a DOC-unit, $N_2O$ or similar. In the case where the characteristic parameter value is the slope of the graph as described above, the characteristic parameter threshold value may be based on a relationship between the slope of the graph and for example $NO_x$-emission. Said predetermined characteristic parameter threshold value and thus said relationship between the operating parameter and the characteristic parameter may be empirically determined by measuring the predetermined operating parameter when the temperature sensor 243 has a correct position as well as when the temperature sensor 243 has an incorrect position due to a nipple. Typically nipples of different lengths are used to thereby determine at which position of the temperature sensor 243 the measured operating parameter exceeds or falls below a determined threshold. The position of the temperature sensor 243 that results in the operating parameter exceeding or falling below the threshold thus corresponds to the predetermined characteristic parameter threshold. For example, the position of the temperature sensor 243 that results in $NO_x$-emissions exceeding a threshold value may correspond to a graph slope (gain factor) of 0.6. The predetermined characteristic parameter threshold value is thus 0.6. The determined characteristic parameter value in the situation as illustrated by graph B may for example be 0.5. The determined characteristic parameter value (0.5) is thus lower than the predetermined characteristic parameter threshold value (0.6) and it is thereby determined that the temperature sensor 243 in the situation illustrated in graph B has an incorrect position. The determined characteristic parameter value in the situation as illustrated in graph A may be essentially 1. The determined characteristic parameter value (1) is thus not lower than the predetermined characteristic parameter threshold value (0.6) and it is thereby determined that the temperature sensor 243 in the situation illustrated in graph A has a correct position.

FIG. 4a schematically illustrates a flow chart of a method for determining a correct or incorrect position of a temperature sensor for measuring a prevailing temperature in an emission control system of a combustion engine. The method may comprise a diagram as illustrated in FIG. 3.

The method comprises a first method step s401. The method step s401 comprises the steps of:

determining a first reference temperature Tr1 within a first temperature interval Int1;

measuring a first temperature T1 by means of said temperature sensor 243 corresponding to said first temperature interval Int1;

determining a second reference temperature Tr2 within a second temperature interval Int2, wherein said second temperature interval Int2 differs from said first temperature interval Int1;

measuring a second temperature T2 by means of said temperature sensor 243 corresponding to said second temperature interval Int2;

determining a value for a characteristic parameter based on said first reference temperature Tr1, said first measured temperature T1, said second reference temperature Tr2 and said second measured temperature T2;

comparing said determined value for said characteristic parameter with a predetermined characteristic parameter threshold value, said predetermined characteristic parameter threshold value being based upon determined operation parameter results for different positions of said temperature sensor for predetermined engine operation characteristics; and based upon said comparison, determining a correct or an incorrect position of said temperature sensor.

After the method step s401 the method ends/is returned.

Figure 4B:
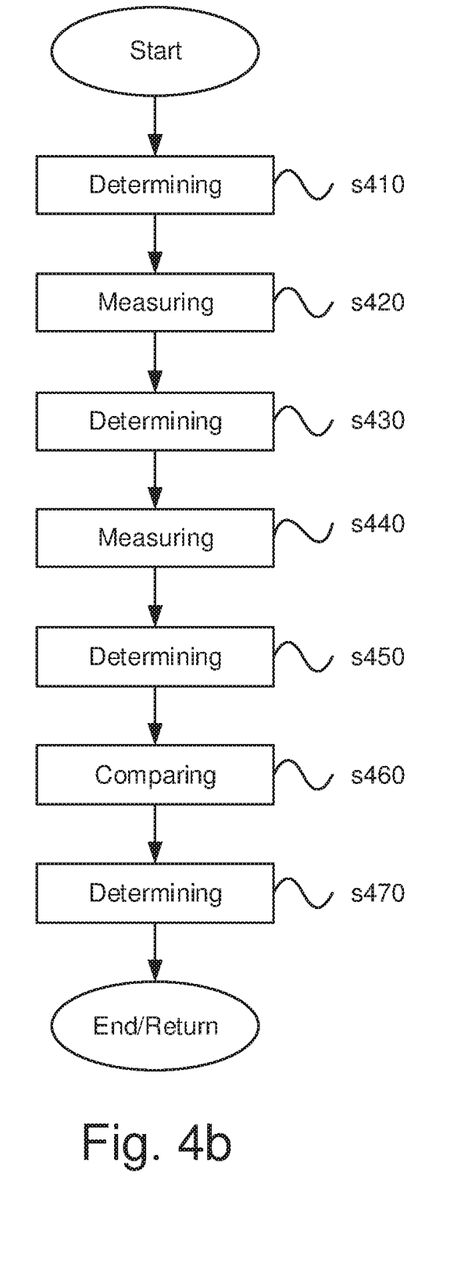
FIG. 4b is a schematic flowchart of a method according to an embodiment of the invention.

FIG. 4b schematically illustrates a method for determining a correct or an incorrect position of a temperature sensor for measuring a prevailing temperature in an emission control system of a combustion engine. The correct position means that the temperature sensor has not been tampered by means of a nipple and the incorrect position means that the temperature sensor has been tampered by means of a nipple. The method is also described in FIG. 3.

The method comprises a first method step s410. The method step s410 comprises determining a first reference temperature Tr1 within a first temperature interval Int1. The first reference temperature Tr1 may be a reference temperature of the temperature at a specific location in the emission control system. The first reference temperature Tr1 may be a reference temperature of the temperature at the location of the temperature sensor. After the method step s410 a subsequent method step s420 is performed.

The method step s420 comprises measuring a first temperature T1 by means of said temperature sensor corresponding to said first temperature interval Int1. Said first measured temperature is thus determined within the first temperature interval Int1 defined by the first reference temperature Tr1. If the temperature sensor is arranged at a location different from the location for which the first reference temperature is determined, the first measured temperature T1 may be used in a model to calculate a temperature value corresponding to the location of the first reference temperature. After the method step s420 a subsequent method step s430 is performed.

The method step s430 comprises determining a second reference temperature Tr2 within a second temperature interval Int1, wherein said second temperature interval Int1 differs from said first temperature interval Int1. The second reference temperature Tr2 may be a reference temperature of the temperature at the same location as the first reference temperature. The second reference temperature Tr2 may thus be a second reference temperature of the temperature at the location of the temperature sensor. The second temperature interval Int1 may be higher than the first temperature interval Int1. Said first reference temperature Tr1 and said second reference temperature Tr2 may be determined by means of a model estimating the temperature of the exhaust gas at the location of the temperature sensor. The model, and thus the reference temperature Tr1, Tr2, is based on the prevailing operating conditions. At a certain operating condition, the model will provide a specific reference temperature Tr1, Tr2. It may thus be known that at certain operating conditions the model will provide a relatively low reference temperature Tr1 respectively a relatively high reference temperature Tr2. The method step s410 may thus comprise determining that the operating conditions are such that the model would provide a reference temperature within a first temperature interval Int1 and then determining the first reference temperature Tr1. Likewise, the method step s430 may comprise determining that the operating conditions are such that the model would provide a reference temperature within a second temperature interval Int2, different from the first temperature interval Int1, and then determining the second reference temperature Tr2.

After the method step s430 a subsequent method step s440 is performed.

The method step s440 comprises measuring a second temperature T2 by means of said temperature sensor corresponding to said second temperature interval Int2. After the method step s440 a subsequent method step s450 is performed.

The method steps of determining s410 the first reference temperature Tr1 and measuring s420 the first temperature T1 may be performed before or after the steps of determining s430 the second reference temperature Tr2 and measuring s440 the second temperature T2.

The method step s450 comprises determining a value for a characteristic parameter based on said first reference temperature Tr1 and said first measured temperature T1, and said second reference temperature Tr2 and said second measured temperature T2. Said determining of a characteristic parameter value is further described in FIG. 3. After the method step s450 a subsequent method step s460 is performed.

The method step s460 comprises comparing said determined value for said characteristic parameter with a predetermined characteristic parameter threshold value, said predetermined characteristic parameter threshold value being based upon the determined operation parameter results for different positions of said temperature sensor for predetermined engine operation characteristics. Said predetermined characteristic parameter threshold value is further described in FIG. 3. After the method step s460 a subsequent method step s470 is performed.

The method step s470 comprises, based upon said comparison, determining a correct or an incorrect position of said temperature sensor. If it has been determined that the temperature sensor is incorrectly positioned the method may comprise adapting/correcting the temperature sensor signal so as to provide a more correct prevailing measured temperature value corresponding to the emission control system of a combustion engine.

After the step s470 the method is ended/returned.

Figure 5:
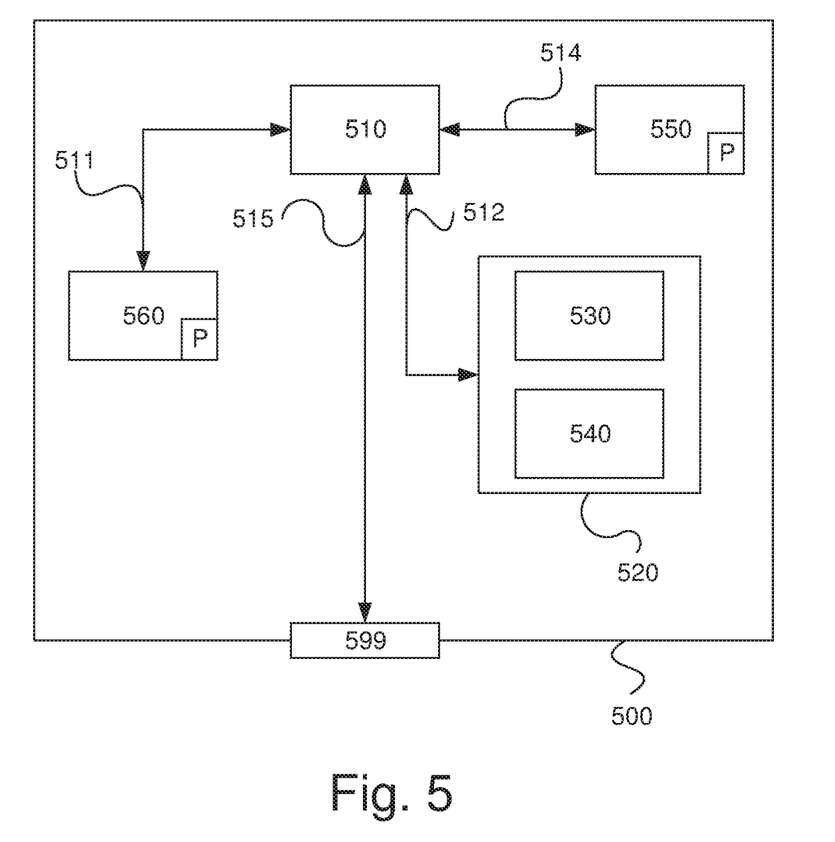
FIG. 5 schematically illustrates a computer according to an embodiment of the invention.

FIG. 5 illustrates a diagram of one version of a device 500. The control units 200 and 210 described with reference to FIGS. 2a and 2b may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for determining a correct or an incorrect position of a temperature sensor for measuring a prevailing temperature in an emission control system of a combustion engine.

The computer program P comprises routines for determining a first reference temperature Tr1 within a first temperature interval Int1.

The computer program P comprises routines for measuring a first temperature T1 by means of said temperature sensor corresponding to said first temperature interval Int1.

The computer program P comprises routines for determining a second reference temperature Tr2 within a second temperature interval Int1, wherein said second temperature interval Int1 differs from said first temperature interval Int1.

The computer program P comprises routines for measuring a second temperature T2 by means of said temperature sensor corresponding to said second temperature interval Int1.

The computer program P comprises routines for determining a value V for a characteristic parameter based on said first reference temperature Tr1 and said first measured temperature T1, and said second reference temperature Tr2 and said second measured temperature T2.

The computer program P comprises routines for comparing said determined value for said characteristic parameter with a predetermined characteristic parameter threshold value, said predetermined characteristic parameter threshold value being based upon the determined operation parameter results for different positions of said temperature sensor for predetermined engine operation characteristics.

The computer program P comprises routines for, based upon said comparison, determining a correct or an incorrect position of said temperature sensor.

The computer program P may comprise routines for determining that there is only a minor difference between said first reference temperature Tr1 and said first measured temperature T1.

The computer program P may comprise routines for determining a slope of a graph connecting a coordinate specifying said first reference temperature Tr1 and said first measured temperature T1, in a measured temperature/reference temperature coordinate system, and a coordinate specifying said second reference temperature Tr2 and said second measured temperature T2 in said coordinate system, as said characteristic parameter value.

The program P may be stored in an executable form or in a compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L230, L231, L233, L237, L243 and L253, for example, may be connected to the data port 599 (see FIG. 2a and FIG. 2b).

When data are received on the data port 599, they are stored temporarily in the second memory element 540.

When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, method steps and process steps herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The components and features specified above may within the framework of the invention be combined between different embodiments specified.

The invention claimed is:

1. A method for determining a correct or an incorrect position of a temperature sensor for measuring a prevailing temperature in an emission control system of a combustion engine, comprising the steps of:
    determining with a model a first reference temperature of a location in the emission control system within a first temperature interval corresponding to a first operational condition;
    measuring a first temperature by means of said temperature sensor corresponding to said first temperature interval;
    determining with the model a second reference temperature of the location in the emission control system within a second temperature interval corresponding to a second operational condition, wherein said second temperature interval differs from said first temperature interval;
    measuring a second temperature by means of said temperature sensor corresponding to said second temperature interval;
    determining a value for a characteristic parameter based on said first reference temperature, said first measured temperature, said second reference temperature and said second measured temperature;
    comparing said determined value for said characteristic parameter with a predetermined characteristic parameter threshold value, said predetermined characteristic parameter threshold value being based upon determined operation parameter results for different positions of said temperature sensor for predetermined engine operation characteristics; and
    based upon said comparison, determining a correct or an incorrect position of said temperature sensor.

2. The method according to claim 1, further comprising the step of:
    determining that there is only a minor difference between said first reference temperature and said first measured temperature.

3. The method according to claim 1, further comprising the step of:
    determining a slope of a graph connecting a coordinate specifying said first reference temperature and said first measured temperature, in a measured temperature/reference temperature coordinate system, and a coordinate specifying said second reference temperature and said second measured temperature in said coordinate system, as said characteristic parameter value.

4. A computer program product comprising a program code stored on a non-transitory computer-readable medium for performing method steps according to claim 1, when said computer program is run on an electronic control unit or a computer connected to the electronic control unit.

5. A system for determining a correct or an incorrect position of a temperature sensor for measuring a prevailing temperature in an emission control system of a combustion engine, comprising:
    means arranged for determining with a model a first reference temperature at a location in the emission control system within a first temperature interval corresponding to a first operational condition;
    means arranged for measuring a first temperature by means of said temperature sensor corresponding to said first temperature interval;
    means arranged for determining with the model a second reference temperature at the location in the emission control system within a second temperature interval corresponding to a second operational condition, wherein said second temperature interval differs from said first temperature interval;
    means arranged for measuring a second temperature by means of said temperature sensor corresponding to said second temperature interval;
    means arranged for determining a value for a characteristic parameter based on said first reference temperature, said first measured temperature, said second reference temperature and said second measured temperature;
    means arranged for comparing said determined value for said characteristic parameter with a predetermined characteristic parameter threshold value, said predetermined characteristic parameter threshold value being based upon determined operation parameter results for different positions of said temperature sensor for predetermined engine operation characteristics; and
    means arranged for, based upon said comparison, determining a correct or an incorrect position of said temperature sensor.

6. The system according to claim 5, further comprising:
    means arranged for determining that there is only a minor difference between said first reference temperature and said first measured temperature.

7. The system according to claim 5, further comprising:
    means arranged for determining a slope of a graph connecting a coordinate specifying said first reference temperature and said first measured temperature, in a measured temperature/reference temperature coordinate system, and a coordinate specifying said second reference temperature and said second measured temperature in said coordinate system, as said characteristic parameter value.

8. The system according to claim 5, wherein different positions of said temperature sensor are specified by means of different lengths of a support nipple arrangement for positioning said temperature sensor at different distances outwardly with respect to an exhaust gas duct of said emission control system, and wherein said different distances corresponds to different measured temperatures.

9. A vehicle comprising a system according to claim 5.

10. The vehicle according to claim 9, wherein said vehicle is any from among a truck, bus or passenger car.

\* \* \* \* \*